United States Patent
Chang

(10) Patent No.: US 9,344,767 B2
(45) Date of Patent: May 17, 2016

(54) METHOD AND DEVICE FOR PRESENTING VIDEO NAVIGATING INTERFACE, DISPLAYING DEVICE AND COMPUTER PROGRAMMING PRODUCT

(71) Applicant: Wistron Corporation, New Taipei (TW)

(72) Inventor: Hui-Liang Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 21 days.

(21) Appl. No.: 14/140,475

(22) Filed: Dec. 25, 2013

(65) Prior Publication Data

US 2014/0208357 A1  Jul. 24, 2014

(30) Foreign Application Priority Data

Jan. 22, 2013  (TW) .............................. 102102392 A

(51) Int. Cl.
*H04N 5/445* (2011.01)
*H04N 21/482* (2011.01)
*H04N 21/278* (2011.01)
*H04N 21/472* (2011.01)
*G06F 17/30* (2006.01)

(52) U.S. Cl.
CPC ...... *H04N 21/4825* (2013.01); *G06F 17/30852* (2013.01); *H04N 21/278* (2013.01); *H04N 21/47202* (2013.01); *H04N 21/4828* (2013.01)

(58) Field of Classification Search
CPC .......................... H04N 21/812; H04N 5/44543
USPC ......................... 725/32, 41, 39, 40, 44–46, 52
See application file for complete search history.

(56) References Cited

U.S. PATENT DOCUMENTS

| | | | |
|---|---|---|---|
| 8,245,257 B1 | 8/2012 | Stettner | |
| 2005/0160458 A1 | 7/2005 | Baumgartner | |
| 2006/0026647 A1* | 2/2006 | Potrebic et al. | 725/53 |
| 2006/0218589 A1 | 9/2006 | Wang et al. | |
| 2007/0156589 A1 | 7/2007 | Zimler et al. | |
| 2008/0098429 A1* | 4/2008 | Urabe et al. | 725/39 |
| 2009/0106202 A1 | 4/2009 | Mizrahi | |
| 2009/0164299 A1 | 6/2009 | Gupta et al. | |
| 2011/0197130 A1 | 8/2011 | Holt | |
| 2012/0297421 A1* | 11/2012 | Kim et al. | 725/41 |
| 2013/0014223 A1 | 1/2013 | Bhatia et al. | |
| 2014/0196081 A1* | 7/2014 | Emans et al. | 725/32 |

FOREIGN PATENT DOCUMENTS

TW  I350694  10/2011

OTHER PUBLICATIONS

"Office Action of Taiwan Counterpart Application" with partial English translation, issued on Jul. 17, 2015, p. 1-p. 17.

* cited by examiner

*Primary Examiner* — Sumaiya A Chowdhury
(74) *Attorney, Agent, or Firm* — Jianq Chyun IP Office

(57) ABSTRACT

A method and a device for presenting a video navigating interface, a displaying device and a computer programming product are provided, the method includes: providing a video navigating interface; obtaining a plurality of video information of a plurality of online videos corresponding to a searching condition, wherein each of the video information includes a plurality of quantitative information; generating a plurality of video blocks according to the video information; retrieving at least two quantitative information from the quantitative information of each video information; adjusting the order of the video blocks and the width of each video block according to the retrieved quantitative information, to generate a video block sequence; and presenting the video block sequence in the video navigating interface.

16 Claims, 4 Drawing Sheets

METHOD AND DEVICE FOR PRESENTING VIDEO NAVIGATING INTERFACE, DISPLAYING DEVICE AND COMPUTER PROGRAMMING PRODUCT

CROSS-REFERENCE TO RELATED APPLICATION

This application claims the priority benefit of Taiwan application serial no. 102102392, filed on Jan. 22, 2013. The entirety of the above-mentioned patent application is hereby incorporated by reference herein and made a part of this specification.

BACKGROUND OF THE INVENTION

1. Field of the Invention

The invention relates to a video navigating interface, and more particularly to a method for presenting the video navigating interface, a device for presenting the video navigating interface using the method, a displaying device, and a computer programming product.

2. Description of Related Art

Generally speaking, a digital television system provides a program schedule through an electronic program guide (EPG) for users to check the information of videos or programs played at different times on different channels.

However, since a diversified means of information transmission are now available, it is getting more popular to watch online videos or listen to online music through the Internet. Take online videos that are broadcasted via the Internet as an example. Since there are many types of online videos and the online videos are not belonging to any television channel, the traditional electronic program guide which presents the information of videos or programs by listing TV channels and program schedule are not suitable for online videos.

SUMMARY OF THE INVENTION

Accordingly, the invention provides a method and device for presenting a video navigating interface, a displaying device, and a computer programming product, which effectively make it more convenient for the users to check the information of online videos via the video navigating guide.

Embodiments of the invention provide a method for presenting a video navigating interface, including steps of providing a video navigating interface; obtaining a plurality of video information of a plurality of online videos corresponding to a searching condition, wherein each video information includes a plurality of quantitative information; generating a plurality of video blocks according to the plurality of video information; retrieving at least two quantitative information from the plurality of quantitative information of each video information; adjusting an order of the video blocks and a width of each video block according to the retrieved quantitative information to generate a video block sequence; and presenting the video block sequence in the video navigating interface.

In an embodiment of the invention, the method for presenting the video navigating interface further includes a step of regularly updating the plurality of video information from the Internet according to a predetermined rule.

In an embodiment of the invention, the quantitative information retrieved from the plurality of quantitative information of each of the video information include a first quantitative information and a second quantitative information, and the step of adjusting the order of the video blocks and the width of each video block according to the retrieved quantitative information to generate the video block sequence includes steps of adjusting the order of the video blocks according to the plurality of first quantitative information; adjusting the width of each video block according to the plurality of second quantitative information; and generating a video block sequence according to the adjusted video blocks.

In an embodiment of the invention, the step of adjusting the order of the video blocks according to the plurality of first quantitative information includes steps of comparing the plurality of first quantitative information to generate a first result, and determining and adjusting the order of the video blocks according to the first result.

In an embodiment of the invention, in the method for presenting the video navigating interface, the step of adjusting the width of each video block according to the plurality of second quantitative information includes steps of comparing the plurality of second quantitative information to generate a second result, and determining and adjusting the width of video blocks according to the second result.

In an embodiment of the invention, the method for presenting the video navigating interface further includes steps of receiving a selecting operation; generating at least two parameters according to the selecting operation; and determining at least two quantitative information in the quantitative information of each video information according to the at least two parameters.

In an embodiment of the invention, the method for presenting the video navigating interface further includes steps of receiving an input operation, and generating a searching condition according to the input operation.

In an embodiment of the invention, the plurality of quantitative information include at least two quantitative information among a video length, a video resolution, a video publication time, a number of viewers, a number of people who like a video, a number of people who dislike the video, a number of people who share a video, and a number of people who comment on a video.

Embodiments of the invention also provide a device for presenting a video navigating interface, which is coupled to a displaying device that displays a video navigating interface. The device for presenting the video navigating interface includes a storage unit and a processing unit. The storage unit stores a plurality of video information of a plurality of online videos, wherein each video information includes a plurality of quantitative information. The processing unit is coupled to the storage unit for providing the video navigating interface, obtaining the plurality of video information of the online videos corresponding to a searching condition, generating a plurality of video blocks according to the plurality of video information, retrieving at least two quantitative information from the plurality of quantitative information of each video information, adjusting an order of the video blocks and a width of each video block according to the retrieved quantitative information to generate a video block sequence, and presenting the video block sequence in the video navigating interface.

In an embodiment of the invention, the device for presenting the video navigating interface further includes an Internet connection unit which provides an Internet accessing function, wherein the processing unit further obtains the plurality of video information from the Internet via the Internet connection unit.

In an embodiment of the invention, the quantitative information retrieved from the plurality of quantitative information of each of the video information include a first quantitative information and a second quantitative information. The processing unit adjusts the order of the video blocks according to the plurality of first quantitative information, adjusts the width of each video block according to the plurality of second quantitative information, and generates the video block sequence according to the adjusted video blocks.

In embodiment of the invention, the processing unit compares the plurality of first quantitative information to generate a first result, and determines and adjusts the order of the video blocks according to the first result.

In embodiment of the invention, the processing unit compares the plurality of second quantitative information to generate a second result, and determines and adjusts the width of the video blocks according to the second result.

In an embodiment of the invention, the device for presenting the video navigating interface further includes an input unit for receiving a selecting operation, wherein the processing unit generates at least two parameters according to the selecting operation, and determines at least two quantitative information in the quantitative information of each video information according to the at least two parameters.

In an embodiment of the invention, the device for presenting the video navigating interface further includes an input unit for receiving an input operation, and generates a searching condition according to the input operation.

In an embodiment of the invention, the plurality of quantitative information include at least two quantitative information among a video length, a video resolution, a video publication time, a number of viewers, a number of people who like a video, a number of people who dislike the video, a number of people who share the video, and a number of people who comment on the video.

Embodiments of the invention further provide a displaying device. The displaying device includes a displaying unit, a storage unit, and a processing unit. The displaying unit displays a video navigating interface. The storage unit stores a plurality of video information of a plurality of online videos, wherein each video information includes a plurality of quantitative information. The processing unit is coupled to the displaying unit and the storage unit for providing the video navigating interface, obtaining the plurality of video information of the online videos corresponding to a searching condition, generating a plurality of video blocks according to the plurality of video information, retrieving at least two quantitative information from the plurality of quantitative information of each video information, adjusting an order of the video blocks and a width of each video block according to the retrieved quantitative information to generate a video block sequence, and presenting the video block sequence in the video navigating interface.

From another perspective, the invention further provides a computer programming product in which a plurality of program codes are stored. After the program codes are loaded in a processing unit, the processing unit executes the program codes to complete the following steps of providing a video navigating interface, obtaining a plurality of video information of online videos corresponding to a searching condition, wherein each video information includes a plurality of quantitative information, generating a plurality of video blocks according to the plurality of video information, retrieving at least two quantitative information from the plurality of quantitative information of each video information, adjusting an order of the video blocks and a width of each video block according to the retrieved quantitative information to generate a video block sequence, and presenting the video block sequence in the video navigating interface.

Based on the above, the invention can obtain corresponding video information according to a searching condition, and generate a corresponding video block according to the obtained video information. Thereafter, at least two quantitative information is retrieved from the plurality of quantitative information of each video information, and the order of the video blocks and the width of each video block are adjusted according to the retrieved plurality of quantitative information for generating the video block sequence that can be presented in the video navigating interface. Accordingly, through checking the video block sequence presented in the video navigating interface, the users can immediately and directly acquire the information of each online video in the user's interested or favorite video categories.

In order to make the aforementioned features and advantages of the invention more comprehensible, embodiments accompanying figures are described in detail below.

DESCRIPTION OF EMBODIMENTS

Figure 1:
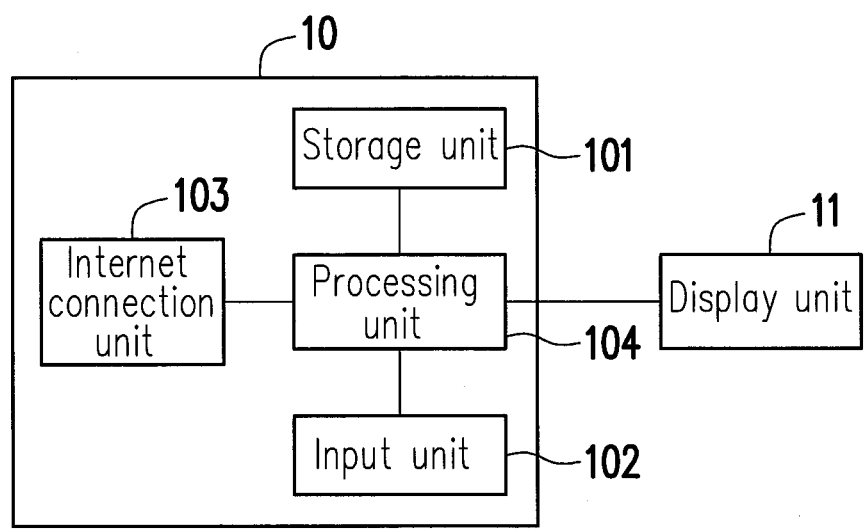
FIG. 1 is diagram illustrating a device for presenting a video navigating interface according to an embodiment of the invention.

FIG. 1 is diagram illustrating a device for presenting a video navigating interface according to an embodiment of the invention. Referring to FIG. 1, in the embodiment, a device 10 for presenting a video navigating interface is, for example, a set top box (STB), a computer, or any electronic device that can perform a calculation function. A displaying device 11 is, for example, a television (TV) or any types of monitor. The device 10 for presenting the video navigating interface may be connected to the displaying device 11 by a wired or wireless manner and controls the displaying device 11 to display a display image.

The device 10 for presenting the video navigating interface includes a storage unit 101, an input unit 102, an Internet connection unit 103, and a processing unit 104. The storage unit 101 stores information. In the embodiment, the storage unit 101 is, for example, any types of non-volatile memory or a combination thereof, such as a read-only memory (ROM) and/or a flash memory. In addition, the storage unit 101 may also include a storage medium such as a hard disk, an optical disk, or an external storage device (such as a memory card, a portable hard drive, etc.) or a combination thereof, which should not be construed as a limitation to the invention. Moreover, in an embodiment, the storage unit 101 may also be a remote storage device and is connected to the device 10 for presenting the video navigating interface through the Internet.

In the embodiment, the storage unit 101 may be adapted for storing a plurality of video information of a plurality of online videos. The foregoing online videos are, for example, any types of online videos or music that can be downloaded from the Internet or directly viewed online such as movies, dramas, short films, news, music, and so on. Meanwhile, the foregoing video information is, for example, any descriptive information and statistics that can be obtained from the Internet and are related to the online videos. For example, the currently common video information include online video information of music information such as the title of a video, the introduction of the video, the length of the video, the type of the video, the resolution of the video, the contributor of the video, the video publication time, a number of viewers, a number of people who like the video, a number of people who dislike the video, a number of people who share the video, a number of people who comment on the video, a link in the video, and so on.

For instance, the storage unit 101 may have a database which has a plurality of information tables, and each information table may be adapted for storing video information of an online video. In the embodiment, each information table in the storage unit 101 may have a plurality of columns such as a video title column, a video introduction column, a video length column, a video type column, a video resolution column, a contributor column, a publication time column, a column of a number of viewers, a column of a number of people who like the video, a column of a number of people who dislike the video, a column of a number of people who share the video, a column of a number of people who comment on the video, a column of a link in a video, and so on, which are adaptable for storing corresponding video information.

In particular, in the embodiment, each video information includes two or more quantitative information, and each quantitative information is statistical information that is shown in quantitative forms. Take the video information recorded in the foregoing information table as an example. The quantitative information in the video information are, for example, at least two quantitative information among a video length, resolution, a video publication time, a number of viewers, a number of people who like a video a the number of people who dislike the video, a number of people who share the video, and a number of people who comment on the video.

The input unit 102 is a wired or wireless signal input device such as a mouse, a keyboard, a remote controller, or etc. The Internet connection unit 103 is, for example, a wired/wireless network interface card, a communication chip, or etc., which may be adapted for providing an Internet accessing function to the device 10 for presenting the video navigating interface. In other words, by the Internet connection unit 103, the device 10 for presenting the video navigating interface can receive information from a remote server host through the Internet or transmit information to the remote server host.

The processing unit 104 is coupled to the displaying device 11, the storage unit 101, the input unit 102, and the Internet connection unit 103. In the embodiment, the processing unit 104 is, for example, a central processing unit (CPU) or any type of chip-set that has a processing and calculation functions. Furthermore, the term "couple to" mentioned above may refer to a physical connection or a wireless connection, which should not be construed as a limitation to the invention.

In the embodiment, the processing unit 104 may regularly update the video information in the storage unit 101 from the Internet according to a predetermined rule. For example, the processing unit 104 may obtain relevant video information via a searching interface provided by an online video searching platform every other period (e.g. every 24 hours) or according to the way the user uses it.

Alternatively, by an online video providing platform or subscripting service provided by an online video provider, the processing unit 104 may also regularly or irregularly receive a video information list from the online video providing platform or the online video provider. The subscripting service mentioned above is, for example, really simple syndication (RSS) service, atom syndication format service, or etc. Moreover, the video information list is in a format of, for example, extensible markup language (XML) or hypertext markup language (HTML).

For instance, when receiving the video information list from the online video providing platform or the online video provider, the processing unit 104 may analyze the video information list according to the XML format or the HTML format to obtain the video information in the video information list. Thereafter, the processing unit 104 may store the analyzed video information in the storage unit 101 according to a database format of the storage unit 101.

In the embodiment, the processing unit 104 may provide a video navigating interface to the displaying device 11 for which to display the video navigating interface to the user, by the video navigating interface, the user can acquire the related information of online videos.

In particular, in the embodiment, the user can perform a specific input operation so that the video navigating interface can meet the user's needs to a greater extent. For example, the user may define a searching condition to be the type of favorite online videos or favorite actors' names. Then, the video navigating interface will present the online videos that match the searching conditions.

Specifically, when the user enters one or more keywords via the input unit 102, the processing unit 104 will use the one or more keywords as a searching condition to retrieve the video information that matches the searching condition from the storage unit 101. For example, when the user enters a keyword "hilarious" via the input unit 102, the processing unit 104 will search for the keyword and retrieve the video information that matches the keyword "hilarious" from the database of storage unit 101.

Furthermore, in an embodiment, the processing unit 104 not only can retrieve the video information that matches the searching condition from the storage unit 101, the processing unit 104 also can obtain the video information that matches the searching condition from the Internet via the Internet connection unit 103. For example, the processing unit 104 may obtain the video information that matches the searching condition via a remote server having an online video searching function or an application programming interface (API) (i.e. searching interface) provided by an online video searching platform, and stores the obtained video information in the storage unit 101.

Take Youtube, which is an online video searching platform, as an example. The processing unit 104 may transmit a query message with a keyword "hilarious" (e.g. gdata.youtube.com/feeds/api/videos/-/hilarious?alt=rss) to the online video searching platform Youtube via the Internet connection unit 103, and then receive a video information list and relevant video information that are returned by the online video searching platform Youtube and contain the keyword "hilarious" and/or match the searching condition.

Thereafter, the processing unit 104 will generate one or more video blocks according to the video information that matches the searching condition among the searching results, wherein each video block corresponds to one video information that matches the searching condition. Subsequently, the processing unit 104 retrieves two or more quantitative information from the plurality of quantitative information of each video information that matches the searching condition from the storage unit 101.

Take the two quantitative information retrieved from the plurality of quantitative information as an example (hereafter first quantitative information and second quantitative information). Assume that the processing unit 104 predetermines the first quantitative information to be publication time information and predetermines the second quantitative information to be the number of viewers. The processing unit 104 will retrieve, from the storage unit 101, a plurality of publication time information from a publication time column in each information table that matches the searching condition, and retrieve a plurality of viewer number information from the column of the number of viewers in each information table that matches the searching condition from the storage unit 101.

Then, since the retrieved plurality of first quantitative information (such as the publication time information) and the plurality of second quantitative information (such as the viewer number information) respectively correspond to each online video that matches the searching condition, and each online video corresponds to each video block, the processing unit 104 can adjust an order of the video blocks and a width of each video block according to the retrieved plurality of first quantitative information (such as the publication time information) and the plurality of second quantitative information (such as the viewer number information) to generate a video block sequence.

Therefore, different from a conventional TV program schedule or an electronic program guide (EPG) that simply presents a program playlist with the time when a program is played and fixed channels, the invention can further fulfill the user's needs when the user searches for online videos or checks the video information of online videos.

Figure 2A:
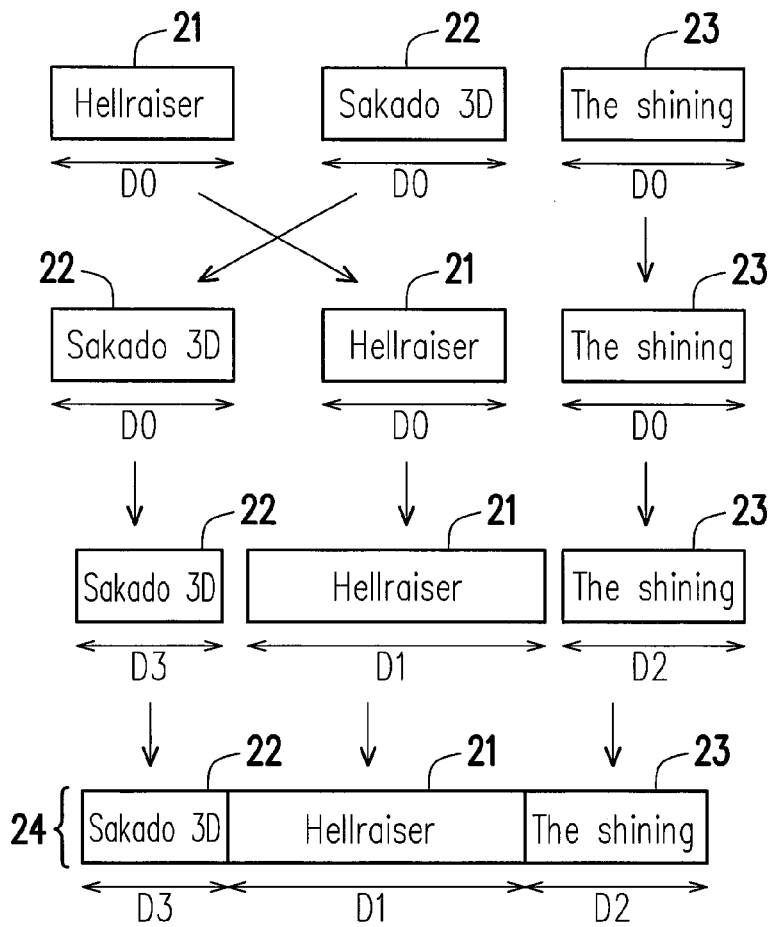
FIG. 2A is diagram illustrating the generation of a video block sequence according to an embodiment of the invention.

FIG. 2A is diagram illustrating generation of a video block sequence according to an embodiment of the invention. Referring to FIG. 2A, first of all, assume that the user sets the keywords to be "horror movies." After searching for the keywords in the storage unit 10 and/or on the Internet, the processing unit 104 will generate video blocks 21-23, and widths of the video blocks 21-23 are a predetermined width D0. As shown in FIG. 2A, for example, the online video to which the video block 21 corresponds is a movie called "Hellraiser;" the online video to which the video block 22 corresponds is a movie called "Sakado 3D," and the online video to which the video block 23 corresponds is a movie called "The shining."

At this point, the processing unit 104 respectively retrieve three first quantitative information and three second quantitative information from the video information of movies "Hellraiser," "Sakado 3D," and "The shining." Thereafter, the processing unit 104 adjusts the order of video blocks 21-23 according to the three first quantitative information. For example, the processing unit 104 compares the plurality of first quantitative information to generate a comparison result to determine and adjust the order of the video blocks according to the comparison result (or a first result).

Take the publication time information of each online video as an example for the first quantitative information. After the processing unit 104 compares the publication time information (i.e. the first quantitative information) of the movies "Hellraiser," "Sakado 3D," and "The shining," assume that the publication time of the movie "Sakado 3D" is the earliest, the publication time of the movie "The shining" is the latest, and the publication time of the movie "Hellraiser" is between the movies "Sakado 3D" and "The shining." At this point, the processing unit 104 may, by an ascending manner, adjust the video block 22 to the first order, wherein the video block 22 corresponds to the movie "Sakado 3D" which is published at an earliest time; adjust the video block 21 to the second order, wherein the video block 21 corresponds to the movie "Hellraiser" which is published at a later time; and adjust the video block 23 to the third order, wherein the video block 23 corresponds to the movie "The shining" which is published the most recently, so that the movies are arranged from the earliest to the latest. Alternatively, the processing unit 104 may arrange the video blocks 21-23 in a descending manner, i.e. from the latest to the earliest, depending on the actual needs.

Subsequently, the processing unit 104 adjust the width of the video blocks 21-23 according to the second quantitative information retrieved from the video information of the movies "Hellraiser," "Sakado 3D," and "The shining." For example, the processing unit 104 compares the plurality of second quantitative information to generate a comparison result to determine and adjust the width of the video blocks according to the comparison result (or a second result).

Take the viewer number information of each online video as an example for the second quantitative information. After the processing unit 104 compares the viewer number information (i.e. the second quantitative information) for the movies "Hellraiser," "Sakado 3D," and "The shining," assume that the number of viewers for the movie "Hellraiser" is the largest, the number of viewers for the movie "Sakado 3D" is the least, and the number of viewers for the movie "The shining" is between the movies "Sakado 3D" and "Hellraiser." At this point, the processing unit 104 adjusts the width of the video block 21 to a first width $D1$, wherein the video block 21 corresponds to the movie "Hellraiser" which is viewed by the largest number of people; adjusts the width of the video block 23 to a second width $D2$, wherein the video block 23 corresponds to the movie "The shining" which is viewed by the second largest number of people; and adjusts the width of the video block 22 to a third width $D3$, wherein the video block 22 corresponds to the movie "Sakado 3D" which is viewed by the least number of people, among which the first width $D1$ is greater than the second width $D2$, the second width $D2$ is greater than the third width $D3$, and the actual width of the first width $D1$, the second width $D2$, and the third width $D3$ may be determined depending on actual needs.

In other words, after the widths are adjusted, each video block will have a corresponding width. For example, if there are three video blocks, the widths of the three video blocks may be the first width $D1$, the second width $D2$, and the third width $D3$, respectively. Alternatively, when two or more video blocks correspond to equivalent second quantitative information, the two or more video blocks may have the same width.

Next, the processing unit 104 generates a video block sequence 24 according to the adjusted video blocks 21-23, and presents the video block sequence 24 in the video navigating interface provided in the processing unit 104. Additionally, the processing unit 104 may also store the generated video block sequence 24 in the storage unit 101. Next time, when providing the video navigating interface, the processing unit 104 can read the generated video block sequence 24 in the storage unit 101 and display the video block sequence 24 in the provided video navigating interface.

Figure 2B:
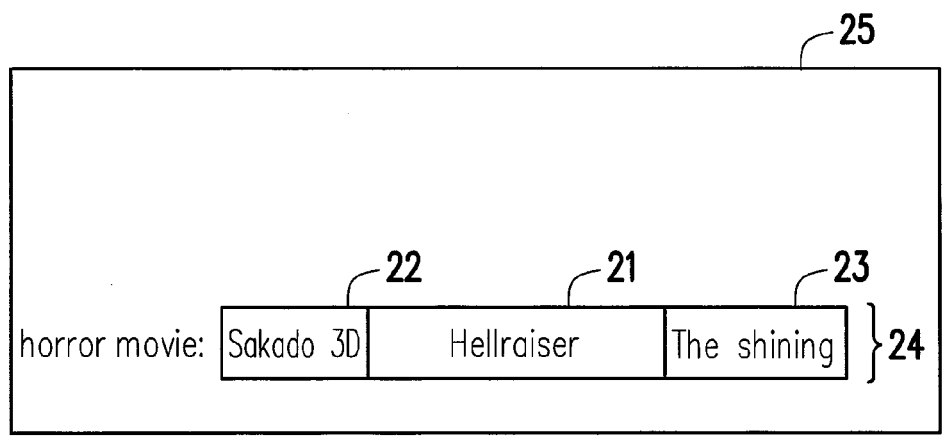
FIG. 2B is diagram illustrating that a video block sequence is presented in a video navigating interface according to an embodiment of the invention.

FIG. 2B is diagram illustrating that a video block sequence is presented in a video navigating interface according to an embodiment of the invention. Referring to FIG. 2B, after obtaining the video block sequence 24, the processing unit 104 presents the video block sequence 24 in a video navigating interface 25 provided in the processing unit 104. Take the video block sequence 24 as an example. Based on the search, the user can know that the online videos that match the keywords "horror movies" are "Hellraiser," "Sakado 3D," and "The shining." In addition, in the video block sequence 24, since the video block 23 to which the movie "The shining" corresponds is in the last order, and the width of the video block 21 to which the movie "Hellraiser" is the greatest, the user can immediately know that, among the three movies, "The shining" is published at a latest time and "Hellraiser" is viewed by the largest number of people.

In other words, through one or more video block sequences presented in the video navigating interface, the user can immediately and directly know what online videos match the searching condition and the comparison results for relevant video information of the online videos such as rating, popularity, publication date, and so on.

In the meantime, in an embodiment, the user can also select the desired online video from the video block sequence on the video navigating interface via the input unit 102 to play the online video to which the selected video block corresponds. For example, in FIG. 2B, when the user knows from the video block sequence 24 on the video navigating interface 25 that the movie "Hellraiser" is published currently and is viewed by a large number of people, the user can perform a selecting operation to select the video block 21 via the input unit 102. Thereafter, when the processing unit 104 detects the selecting operation, the processing unit 104 will correspondingly play the movie "Hellraiser" according to the selecting operation. For example, the processing unit 104 can download the movie "Hellrasier" from the Internet and play it according to a video link in the video information to which the video block 21 corresponds. Accordingly, the ways of presenting video information in the video navigating interface can be significantly diversified, and the operation flexibility in viewing online videos via the video navigating interface is also enhanced.

It should be understood that, in the embodiment, the user not only can enter a self-defined keyword (e.g. "horror movies") to be a searching condition via the input unit 102, the user can also select a favorite keyword from a predetermined keyword list. For example, the processing unit 104 can preset a plurality of predetermined keywords for the user's selection. Then, the user can perform a selecting operation via the input unit 102 to select a desired keyword from the predetermined keywords. Then, the processing unit 104 will present a corresponding video block sequence (e.g. the video block sequence 24) in the video navigating interface according to the keyword selected by the user.

The user not only can define a searching condition (e.g. a keyword), in the embodiment, the user can also decide which quantitative information to be retrieved from each video information.

Figure 3:
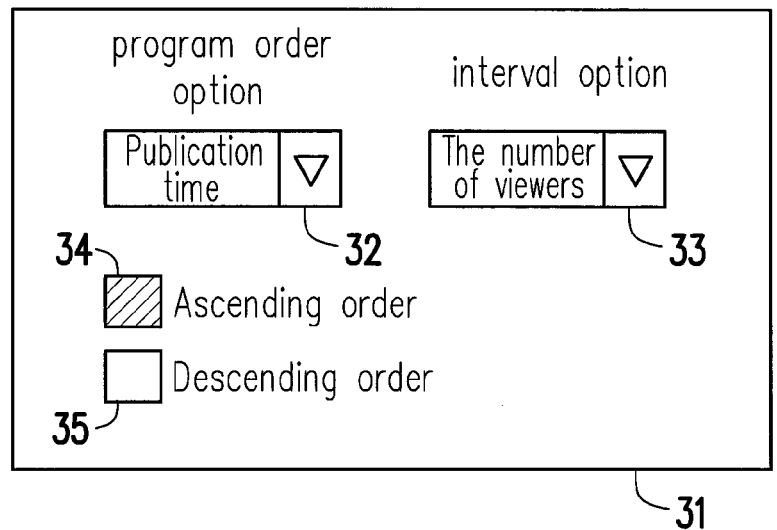
FIG. 3 is diagram illustrating the selection of quantitative information according to an embodiment of the invention.

FIG. 3 is diagram illustrating the selection of quantitative information according to an embodiment of the invention. Referring to FIG. 3, the processing unit 104 can present a setting window 31 in the video navigating interface. Take retrieving two quantitative information as an example. The setting window 31 may include a program order option 32 and an interval option 33, wherein both of the program order option 32 and the interval option 33 can provide a drop-down menu.

When selecting the program order option 32 via the input unit 102, the user can select desired quantitative information (e.g. publication time) from a plurality of quantitative information via the drop-down menu provided in the program order option 32 to be the first quantitative information. Additionally, when selecting the interval option 33 via the input unit 102, the user can select desired quantitative information (e.g. the number of viewers) from a plurality of quantitative information via the drop-down menu provided in the interval option 33 to be the second quantitative information. The setting window 31 not only can provide a drop-down menu as an input interface for the user, the setting window 31 can also display an input block to receive the user's input operation. For example, when the user enters a keyword in an input block in the setting window 31 via the input unit 102, the processing unit 104 will determine the corresponding quantitative information according to the keyword.

In other words, in terms of the processing unit 104, the processing unit 104 can generate a corresponding first parameter according to the user's selecting operation in the program order option 32, and determine a corresponding first quantitative information among each video information according to the first parameter. Also, the processing unit 104 can generate a corresponding second parameter according to the user's selecting operation in the interval option 33, and determine a corresponding second quantitative information among each video information according to the second parameter.

Meanwhile, more parameters (e.g. a third parameter and/or a fourth parameter) may also be adopted to determine more quantitative information (e.g. third quantitative information and/or fourth quantitative information), which should not be construed as a limitation to the invention. For example, in an embodiment, the processing unit 104 can adjust the style of presenting each video block in the video block sequence according to more quantitative information. For example, the processing unit 104 can generate a third parameter according to the user's selecting operation or input operation, and determine a corresponding third quantitative information among each video information according to the third parameter. Then, the processing unit 104 can present each video block in the video block sequence in different colors, shapes, or flickering frequency according to the determined third quantitative information retrieved from each video information. For example, the processing unit 104 can present the video block to which the greatest third quantitative information corresponds in the most rapid flickering frequency, and present the video block to which the least third quantitative information corresponds in the slowest flickering frequency.

Apart from that, through selecting an ascending order option 34 or a descending order option 35 in the setting window 31, the user can also enable the processing unit 104 to order the video blocks from the greatest to the least (i.e. ascending order) or from the least to the greatest (i.e. descending order) according to the quantity of a quantitative information (e.g. first quantitative information) in each video information.

Figure 4:
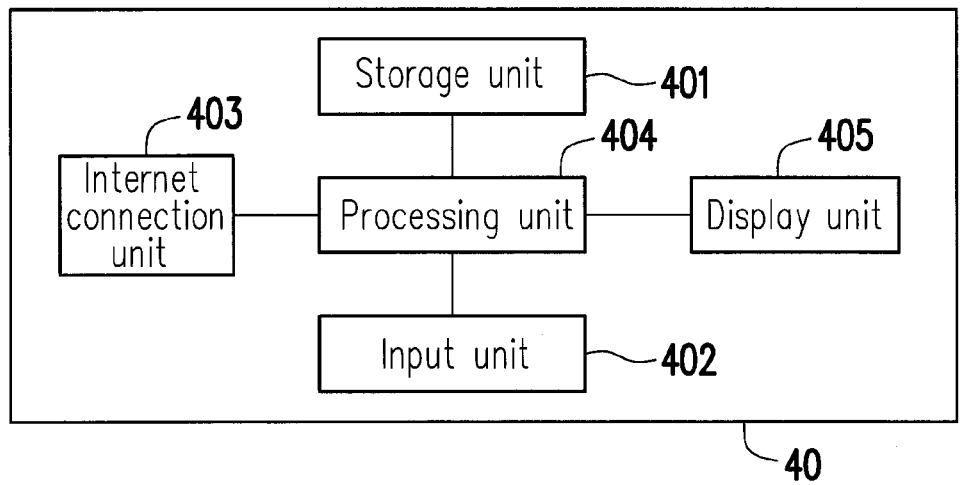
FIG. 4 is diagram illustrating a displaying device according to an embodiment of the invention.

The invention also provides a displaying device. For example, FIG. 4 is diagram illustrating a displaying device according to an embodiment of the invention. Referring to FIG. 4, a displaying device 40 may be any displaying device that has displaying and calculation functions such as a TV, a smart phone, a notebook, a tablet PC, a desktop computer, or etc.

A displaying device 40 includes a storage unit 401, an input unit 402, an Internet connection unit 403, and a processing unit 404, wherein the units are respectively similar to the storage unit 101, the input unit 102, the Internet connection unit 103, and the processing unit 104 in FIG. 1. Therefore, no further description is incorporated herein.

The displaying device 40 further includes a displaying unit 405 which is coupled to the processing unit 404. The displaying unit 405 is similar to the displaying device 11 in FIG. 1 and may be adapted for receiving and displaying a video navigating interface provided by the processing unit 104. In addition, in the embodiment, the input unit 402 may also be combined with the displaying unit 405 to become a displaying unit with a touch control function (e.g. a touch control screen), which should not be construed as a limitation to the invention.

Since the displaying device 40 has the basic elements that are included in the foregoing device 10 for presenting a video navigating interface, the displaying device 40 can accomplish the purposes and technical effects that can be accomplished by the foregoing device 10 for presenting a video navigating interface.

Figure 5:
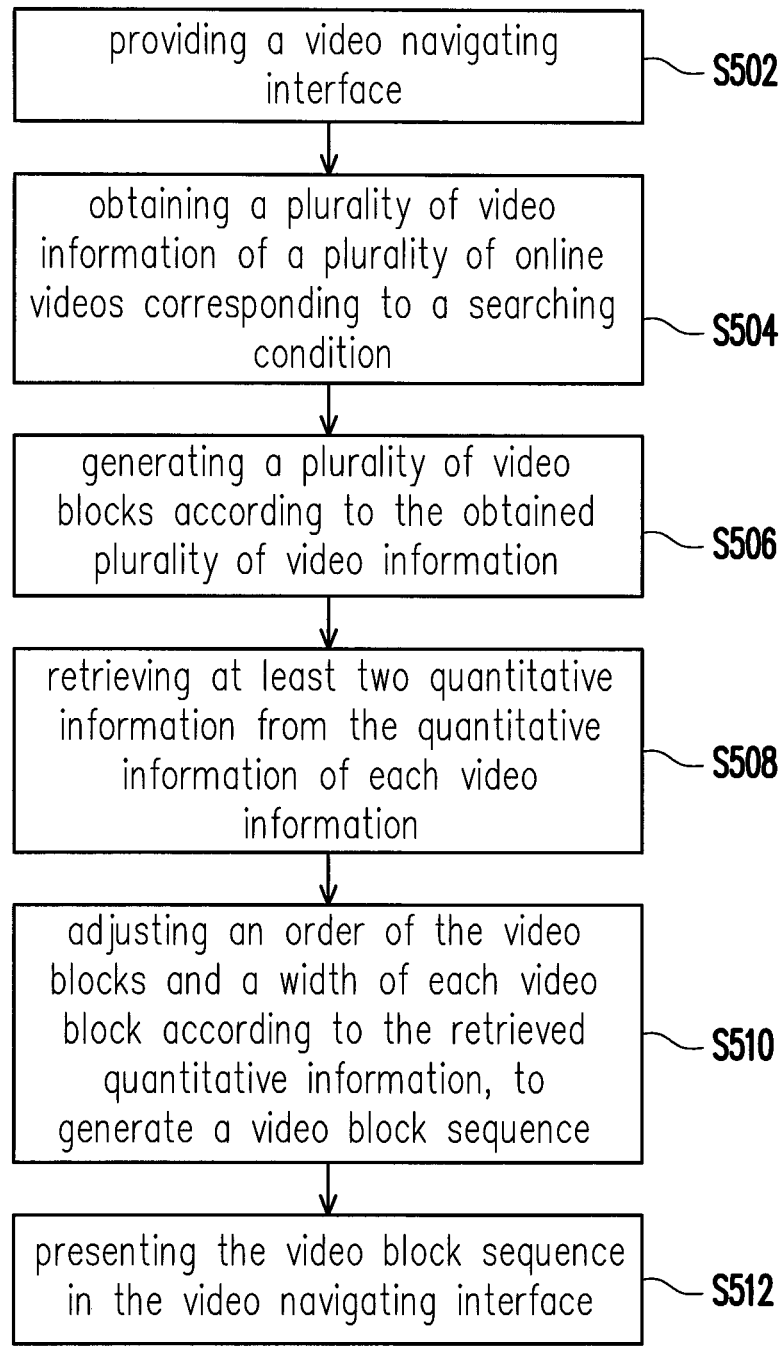
FIG. 5 is diagram illustrating a method for presenting a video navigating interface according to an embodiment of the invention.

Furthermore, the invention also provides a method for presenting a video navigating interface. FIG. 5 is diagram illustrating a method for presenting a video navigating interface according to an embodiment of the invention. The method for presenting a video navigating interface in an embodiment of the invention will be described below by using the device 10 for presenting the video navigating interface in FIG. 1.

Referring to FIGS. 1 and 5, in step S502, the processing unit 404 provides a video navigating interface. Next, in step S504, the processing unit 404 obtains a plurality of video information of a plurality online videos corresponding to a searching condition, wherein each video information includes a plurality of quantitative information. Then, in step S506, the processing unit 404 generates a plurality of video blocks according to the obtained video information. Thereafter, in step S508, the processing unit 404 retrieves at least two quantitative information from the quantitative information of each video information. Furthermore, in step S510, the processing unit 404 adjusts the order of the video blocks and the width of each video block according to the retrieved quantitative information to generate a video block sequence. Then, in step S512, the processing unit 404 presents the video block sequence in the video navigating interface provided therein.

Specifically, with regard to the details of the foregoing method, sufficient teaching, suggestions, and conduction can be obtained from the foregoing embodiments. Therefore, no further description is incorporated herein.

In addition, each step in the method for presenting the video navigating interface mentioned in the foregoing embodiments may be implemented in the form of software or firmware. For example, another embodiment of the invention provides a computer programming product, and the concept thereof is similar to that of the foregoing embodiments. The computer programming product may have a plurality of program codes. After the program codes are loaded in a processor (e.g. a processor 101), the processor executes the program codes to complete the steps in the method described in the foregoing embodiments and relevant actuations. The computer programming product may include a read-only memory (ROM), a flash memory, a CD-ROM, a magnetic tape, a flexible disk, an optical information storage element, and etc. The computer programming product may also be distributed in a computer system coupled to the network to store and execute the foregoing program codes in a distribution manner.

To sum up, the method and device for presenting the video navigating interface, the displaying device, and the computer programming product in the embodiment of the invention can provide a video navigating interface, and display the user's interested or favorite online videos in the video navigating interface via a video block sequence according to a keyword selected or entered by the user. In particular, the video block sequence presented in the video navigating interface is characterized by two or more corresponding quantitative information that the user is interested in. The characteristics may be presented in a manner such as the order of the video blocks, the width, colors, shapes, or flickering frequency of the video blocks. Accordingly, by viewing each video block sequence in the video navigating interface, the user can immediately and directly know information such as the rating, popularity, publication date of each online video in the user's interested or favorite video categories.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A method for presenting a video navigating interface, comprising:
   providing a video navigating interface;
   obtaining a plurality of video information of a plurality of online videos corresponding to a searching condition; wherein each of the video information comprises a plurality of quantitative information;
   generating a plurality of video blocks according to the plurality of video information;
   configuring at least two customized types related to the plurality of quantitative information according to a selection operation;
   retrieving at least two quantitative information from the plurality of quantitative information of each of the video information according to the at least two customized types;
   adjusting an order of the video blocks and a width of each of the video blocks according to the retrieved plurality of quantitative information, to generate a video block sequence; and
   presenting the video block sequence in the video navigating interface,
   wherein the plurality of quantitative information retrieved from the plurality of quantitative information of each of the video information comprise a first quantitative information and a second quantitative information,
   wherein the step of adjusting the order of the video blocks and the width of each of the video blocks according to the retrieved plurality of quantitative information to generate the video block sequence comprises:
   adjusting the order of the video blocks according to the plurality of first quantitative information;
   adjusting the width of each of the video blocks according to the plurality of second quantitative information; and
   generating the video block sequence according to the adjusted video blocks.

2. The method for presenting the video navigating interface according to claim 1, further comprising:
   regularly updating the plurality of video information from the Internet according to a predetermined rule.

3. The method for presenting the video navigating interface according to claim 1, wherein the step of adjusting the order of the video blocks according to the plurality of first quantitative information comprises:
   comparing the plurality of first quantitative information to generate a first result; and
   determining and adjusting the order of the video blocks according to the first result.

4. The method for presenting the video navigating interface according to claim 3, wherein the step of adjusting the width of each of the video blocks according to the plurality of second quantitative information comprises:
   comparing the plurality of second quantitative information to generate a second result; and
   determining and adjusting the width of the video blocks according to the second result.

5. The method for presenting the video navigating interface according to claim 1, wherein the step of retrieving the at least two quantitative information from the plurality of quantitative information of each of the video information according to the at least two customized types comprises:
   generating at least two parameters according to the at least two customized types; and
   determining the at least two quantitative information among the plurality of quantitative information of each of the plurality of video information according to the at least two parameters.

6. The method for presenting the video navigating interface according to claim 1, further comprising:
   receiving an input operation; and
   generating the searching condition according to the input operation.

7. The method for presenting the video navigating interface according to claim 1, wherein the plurality of quantitative information comprise at least two quantitative information among a video length, a video resolution, a video publication time, a number of viewers, a number of people who like a video, a number of people who dislike the video, a number of people who share the video, and a number of people who comment on the video.

8. A device for presenting a video navigating interface, which is coupled to a displaying device, wherein the displaying device displays a video navigating interface, comprising:
   a storage unit, storing a plurality of video information of a plurality of online videos, wherein each of the plurality of video information comprises a plurality of quantitative information; and
   a processing unit, coupled to the storage unit, providing the video navigating interface to the displaying device, obtaining the plurality of video information of the online videos corresponding to a searching condition, generating a plurality of video blocks according to the plurality of video information, configuring at least two customized types related to the plurality of quantitative information according to a selection operation, retrieving at least two quantitative information from the plurality of quantitative information of each of the plurality of video information according to the at least two customized types, adjusting an order of the video blocks and a width of each of the video blocks according to the retrieved plurality of quantitative information to generate a video block sequence, and presenting the video block sequence in the video navigating interface,
   wherein the plurality of quantitative information retrieved from the plurality of quantitative information of each of the plurality of video information comprise a first quantitative information and a second quantitative information, the processing unit adjusts the order of the video blocks according to the plurality of first quantitative information, adjusts the width of each of the video blocks according to the plurality of second quantitative information, and generates the video block sequence according to the adjusted video blocks.

9. The device for presenting the video navigating interface according to claim 8, further comprising an Internet connection unit which provides an Internet accessing function,
   wherein the processing unit further obtains the plurality of video information from the Internet via the Internet connection unit.

10. The device for presenting the video navigating interface according to claim 8, wherein the processing unit compares the plurality of first quantitative information to generate a first result, and to determine and adjust the order of the video blocks according to the first result.

11. The device for presenting the video navigating interface according to claim 10, wherein the processing unit compares the plurality of second quantitative information to generate a second result, and to determine and adjust the width of the video blocks according to the second result.

12. The device for presenting the video navigating interface according to claim 8, further comprising an input unit which receives the selecting operation,
   wherein the processing unit generates at least two parameters according to the at least two customized types, and determines the at least two quantitative information among the plurality of quantitative information of each of the plurality of video information according to the at least two parameters.

13. The device for presenting the video navigating interface according to claim 8, further comprising an input unit which receives an input operation, and generates the searching condition according to the input operation.

14. The device for presenting the video navigating interface according to claim 8, wherein the plurality of quantitative information comprise at least two quantitative information among a video length, a video resolution, a video publication time, a number of viewers, a number of people who like a video, a number of people who dislike the video, a number of people who share the video, and a number of people who comment on the video.

15. A displaying device, comprising:
   a displaying unit, displaying a video navigating interface;
   a storage unit, storing a plurality of video information of a plurality of online videos, wherein each of the plurality of video information comprises a plurality of quantitative information; and
   a processing unit, coupled to the displaying unit and the storage unit, providing the video navigating interface to the displaying unit, obtaining the plurality of video information of the online videos corresponding to a searching condition, generating a plurality of video blocks according to the plurality of video information, configuring at least two customized types related to the plurality of quantitative information according to a selection operation, retrieving at least two quantitative information from the plurality of quantitative information of each of the video information according to the at least two customized types, adjusting an order of the video blocks and a width of each of the video blocks according to the retrieved plurality of quantitative information to generate a video block sequence, and presenting the video block sequence in the video navigating interface,
   wherein the plurality of quantitative information retrieved from the plurality of quantitative information of each of the plurality of video information comprise a first quantitative information and a second quantitative information, the processing unit adjusts the order of the video blocks according to the plurality of first quantitative information, adjusts the width of each of the video blocks according to the plurality of second quantitative information, and generates the video block sequence according to the adjusted video blocks.

16. A non-transitory computer readable medium, storing a plurality of program codes, wherein after the program codes are loaded in a processing unit, the processing unit executes the program codes to complete the following steps:

provingi a video navigating interface;

obtaining a plurality of video information of a plurality of online videos corresponding to a searching condition, wherein each of the video information comprises a plurality of quantitative information;

generating a plurality of video blocks according to the plurality of video information;

configuring at least two customized types related to the plurality of quantitative information according to a selection operation;

retrieving at least two quantitative information from the plurality of quantitative information of each of the video information according to the at least two customized types;

adjusting an order of the video blocks and a width of each of the video blocks according to the retrieved plurality of quantitative information to generate a video block sequence; and presenting the video block sequence in the video navigating interface, wherein the plurality of quantitative information retrieved from the plurality of quantitative information of each of the video information comprise a first quantitative information and a second quantitative information, wherein the step of adjusting the order of the video blocks and the width of each of the video blocks according to the retrieved plurality of quantitative information to generate the video block sequence comprises:

adjusting the order of the video blocks according to the plurality of first quantitative information;

adjusting the width of each of the video blocks according to the plurality of second quantitative information; and generating the video block sequence according to the adjusted video blocks.

* * * * *